United States Patent [19]

Klose et al.

[11] Patent Number: 5,135,601
[45] Date of Patent: Aug. 4, 1992

[54] PLY MATERIAL SERVER APPARATUS

[75] Inventors: Karl W. Klose; Richard K. Crooks, both of Findlay, Ohio

[73] Assignee: Cooper Tire & Rubber Company, Findlay, Ohio

[21] Appl. No.: 529,061

[22] Filed: May 25, 1990

[51] Int. Cl.⁵ .............................................. B29D 30/16
[52] U.S. Cl. ................................ 156/406.4; 156/406; 156/396; 242/56 R
[58] Field of Search .............. 156/111, 131, 133, 134, 156/396, 406, 406.4, 421, 540; 242/56 R; 226/171

[56] References Cited

U.S. PATENT DOCUMENTS

| 3,623,677 | 11/1971 | Appleby et al. | 242/57 X |
|---|---|---|---|
| 3,789,712 | 2/1974 | Enders | 83/171 |
| 4,052,245 | 10/1977 | Kutz | 156/133 |
| 4,398,988 | 8/1983 | Mullender | 156/405.1 |
| 4,402,782 | 9/1983 | Klose et al. | 156/414 |
| 4,469,546 | 9/1984 | Klose | 156/406.2 |
| 4,820,373 | 4/1989 | Klose | 156/405.1 |
| 4,874,443 | 10/1989 | Kipling | 156/134 |

Primary Examiner—Michael W. Ball
Assistant Examiner—Francis Lorin
Attorney, Agent, or Firm—Joseph G. Nauman

[57] ABSTRACT

A ply server for applying a preselected length of ply material drawn from a supply roll thereof onto a tire carcass building drum. The desired length of ply material is measured by a programmable mechanism, then severed at the length desired. The incoming ply material is center guided onto the ply conveyor, or (optionally) a transverse scanner device is used to determine the location of the longitudinal centerline of the length of ply material. The carcass building drum is precisely located with respect to the longitudinal centerline of the ply material. At the opposite end of the server, there is a receptor arrangement into which a cart bearing the supply roll can be brought to the server and the ply material fed into the server, with the separator for the rolled uncured ply material being rewound as part of the material pay-out process.

12 Claims, 10 Drawing Sheets

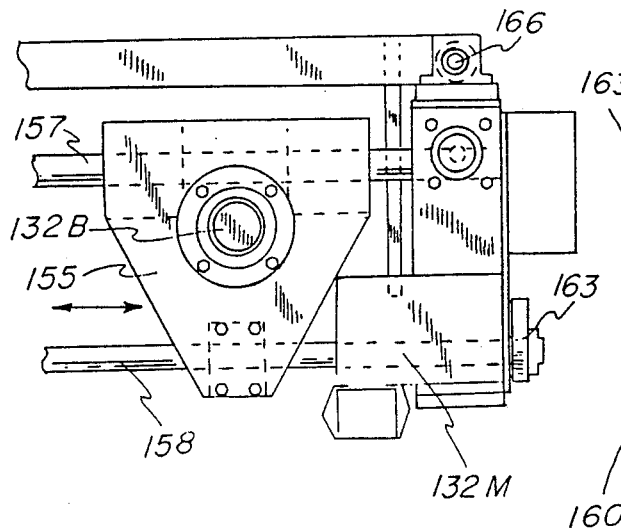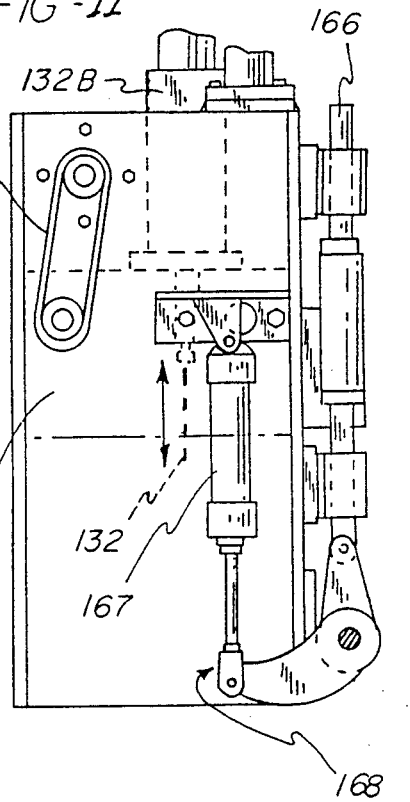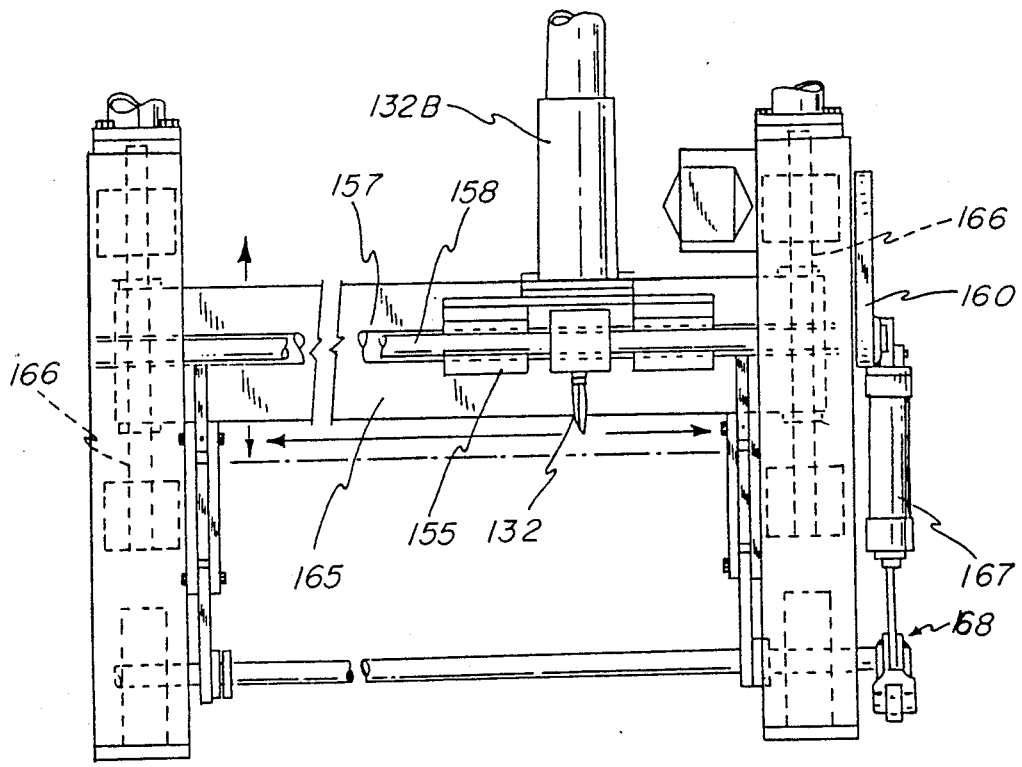

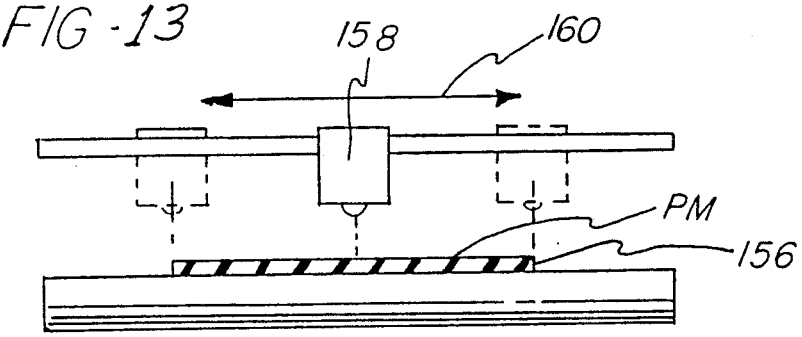
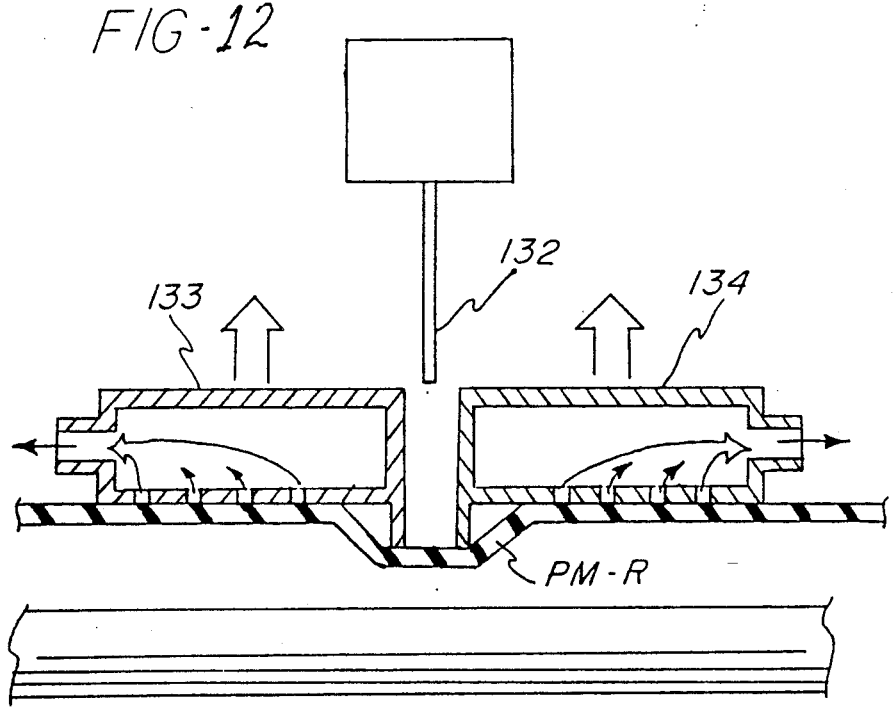

PLY MATERIAL SERVER APPARATUS

BACKGROUND OF THE INVENTION

This invention relates to an apparatus for the assembly of radial tire components, and more particularly, to a ply server assembly having means for drawing a preselected length of ply material from a supply roll and applying it onto a carcass building drum.

Previous methods for building the first stage cylindrical carcass have required manually measuring and cutting a length of ply material drawn from a large supply roll and applying it onto a carcass building drum. Such an operation is relatively time consuming and expensive to perform. It also requires the operator/builder to physically handle the various uncured lengths (or sheets) of ply material.

When applying the two-stage method of assembling a modern radial tire, it is common to use a first stage carcass assembly machine and a second stage machine on which the carcass from the first stage is chucked by its beads and then transformed from a cylinder into a toroidal shape, at which time the belt-tread stock package is added to the carcass, and the assembly is then consolidated by stitching the two tacky subassemblies together.

The basic elements of a modern radial ply pneumatic tire consist of an inner liner, one or more plies, sidewalls, beads, fillers and other bead reinforcements, all of which, when properly assembled, form an assembly called a first stage carcass, as well as a belt-tread stock assembly comprising one or more belts incorporating steel cord or other suitable cord materials and a length of tread stock combined to form a belt-tread stock package or second stage assembly. The first stage carcass and the belt-tread stock package are then combined into a green tire, which is subsequently molded and cured in a vulcanizer.

One form of apparatus for combining the two assemblies is described in U.S. Pat. No. 4,402,782 issued Sep. 6, 1983, to the assignee of this application. The two major assemblies are produced on two distinct and separate types of apparatus which are then combined into a so-called green tire.

The carcass is initially cylindrical and consists of one or more body plies of rubber coated cord, a pair of axially spaced parallel bead rings, layers of the ply material which encompass the bead rings, and side wall stock material. These tire elements are typically assembled in a manually operated apparatus, and consolidated on a cylindrical carcass building drum into the shape of a cylinder. Then the cylindrical carcass is loaded, in most cases manually, onto a tire building or assembly drum (FIGS. 18 and 19 of said U.S. Pat. No. 4,402,782) and re-shaped into a toroidal carcass.

The handling and storage of carcass components adds many uncontrollable and undesirable process variables to the product, such as exposure to touching by human hands and associated exposure to dirt, grease, perspiration, remnants of soap or detergents or skin creams. In addition, there is an undetermined exposure to airborne particles which deposit on the outer surface of the carcasses. The unknown duration of that exposure, anywhere from one hour to three or four days (on long weekends), results in undesirable distortions and carcass deformations.

SUMMARY OF THE INVENTION

The present invention is a ply material server assembly and method designed to substantially reduce the manufacturing time and costs associated with manually drawing, measuring, and cutting a length of ply material and applying it to a building drum, and to avoid manual handling of ply materials from which the carcass is built.

The ply material server assembly comprises a cartridge for supporting a large roll of ply material, and a server comprising a continuous conveyor belt, means for withdrawing the ply material from the cartridge, feeding rollers or the like for feeding the ply material onto the continuous conveyor belt, a knife for cutting the ply material to a preselected length, means for scanning the incoming ply material and centering it on the conveyor belt, or alternatively for scanning the ply material width-wise and determining its centerline on the conveyor, after which the ply material is carried forward and placed into a ready position for subsequent contact with the drum, which is positioned under programmable control to bring its center plane, which is transverse to its axis of rotation, into alignment with the ply material in the ready position.

Further, the present invention is directed to a ply material server method useful for drawing, cutting, and applying ply material onto a building drum. The method comprises the steps of feeding the ply material from a web source onto a conveyor, activating vacuum chambers to grab and lift the ply material, cutting the ply material to a programmable length, releasing the cut ply material while holding the end of the supply web, driving the conveyor belt until the leading portion of the ply material is moved down to a position generally aligned with respect to the central plane of the building drum (when it is at the server location), scanning and determining the longitudinal centerline of the ply material (optional step), positioning the drum to bring its transverse center plane into alignment with the centerline of the ply material, placing the ply material into contact with the drum, and releasing the leading edge of the ply material web onto the conveyor to feed out the next length of ply material.

It is a primary object of the present invention to provide essentially automatic ply servers for drawing, cutting, and measuring a preselected length of material and applying it onto a building drum; to provide such servers which may be easily replenished with new and/or different rolls of ply material; to provide such servers which are programmable to allow rapid conversion to building tire carcasses to different specifications; and to provide such servers which require relatively little attention, and can be operated with minimum manual intervention.

Other objects and advantages of the invention will be apparent from the following description, the accompanying drawings, and the appended claims.

BRIEF DESCRIPTION OF THE DRAWINGS

FIG. 9 is an enlarged view, partly in cross-section, showing the cut-off knife and its control mechanism;

FIG. 10 is an enlarged top view of a portion of the knife assembly;

FIG. 11 is a side view of the knife mechanism;

FIG. 12 is a detail view showing how the ply material is held and cut; and

FIG. 13 is a schematic view of an optional transverse scanner for determining the centerline of the ply material.

DESCRIPTION OF THE PREFERRED EMBODIMENT

General Layout

Figure 1:
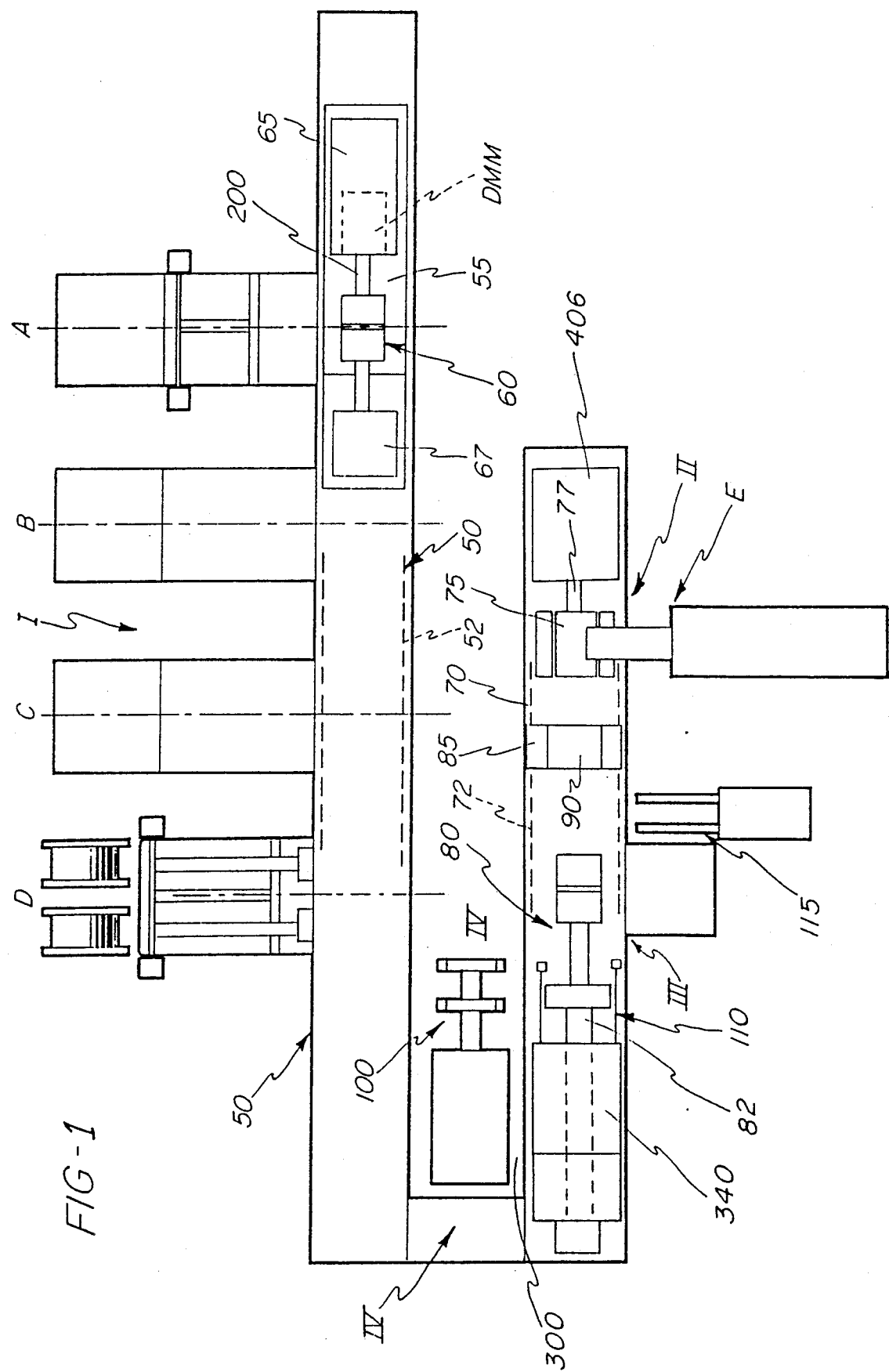
FIG. 1 is a schematic plan view of an integrated tire building system to which the server is particularly adapted.

FIG. 1 is a floor plan of an integrated tire building system which includes on one side a novel carcass building section I, on the other side a belt and tread-stock building section II together with the green tire building section III, and between sections I and III a carcass carrying and transfer section IV, which unloads a completed carcass TC from section I and places it in the tire building section III. This system is disclosed in greater detail in copending U.S. patent application Ser. No. (529,080), filed of even date herewith and assigned to the same assignee.

The carcass building section I includes a bed 50 having a track or way 52 for a carriage 55 that supports a carcass building drum 60 and its associated headstock 65 and tailstock 67, along with bead ring placers 70 for this building drum 60. Track 52 defines a carcass building path and along the track is a plurality of stations A, B, C, and D which function as innerliner, ply and sidewall servers. It should be understood that additional ply servers may be added, as between stations C and D.

In operation, carriage 55 is moved under program control into alignment with the center of ply material or sidewall material at the various stations. Circular beads or hoops 36, combined with a filler 36, are set on bead placers 70 which are associated with drum 60, and predetermined lengths of ply materials are likewise placed on and assembled around the drum, all in a desired sequence, and the edges of at least some plies are turned over the beads, producing a completed tire carcass TC, hereinafter referred to as the first stage carcass assembly.

Sections II and III preferably are supported on a common second bed 70 having another track or way 72 extending in spaced relation to the first track 52, preferably parallel thereto. At one end of the second track 72 there is a belt/tread stock building drum 75 (sometimes called a belt building drum), supported on a rotatable shaft 77 with its axis of rotation extending parallel to second track 72. Adjacent the belt building drum there is a belt server E which can supply one or more belt components to the belt building drum 75, and a tread stock server F (below server E) which can supply a length of tread stock to the belt building drum. At the other end of second track 72 there is a tire building or assembly drum 80, comprising two drum halves rotatably supported on a second shaft 82 with its axis parallel to track 72 and precisely in line with the axis of belt building drum 75. A carriage 85 is supported for movement between the drums 75 and 80 along track 72, and on carriage 85 is a transfer ring 90 which can engage and remove a completed belt/tread stock assembly BTS from belt building drum 75 and move such assembly over and around a carcass which has been placed on tire building drum 80, to be manipulated into a toroidal shape.

Between the two tracks 52 and 72, the transfer section IV includes a carcass transfer robot 100 which functions to remove a first stage tire carcass TC from carcass building drum 60 and position carcass TC onto the tire building drum 80, where the carcass is transformed into the desired toroidal shape, as part of the application of a belt/tread stock assembly to that carcass. The two assemblies are then stitched together to produce a green tire GT. Once the green tire is completed, an unloading mechanism 110 associated with the tire building drum engages the tire, then moves the tire to a discharge chute assembly 115 and releases the tire, from whence the tire is taken to a vulcanizing press for final curing.

First Stage Ply Servers

Figure 2:
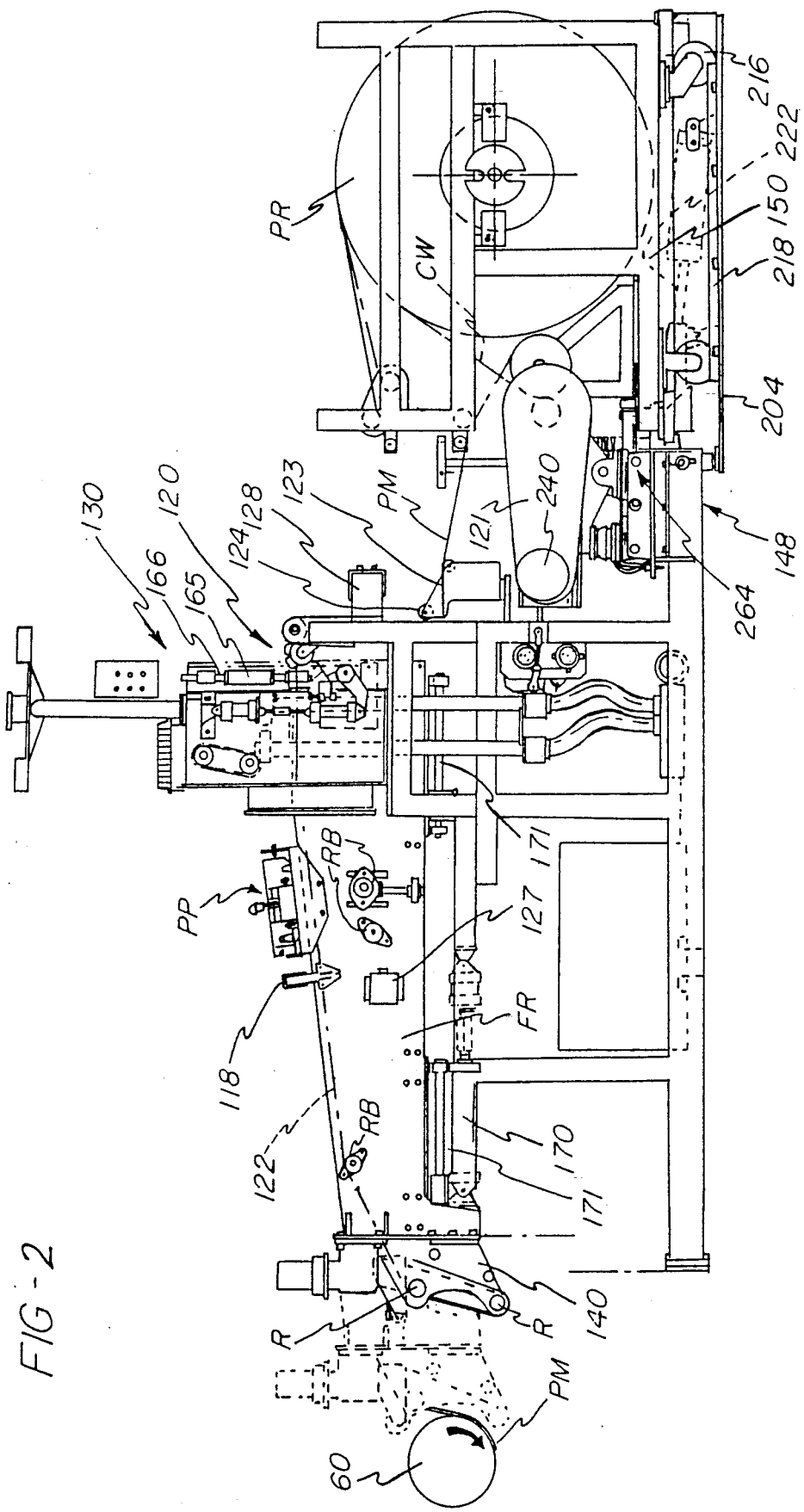
FIG. 2 is a side view of a ply material server assembly having a supply cart in active position, and with a ply material supply roll and a carrier web take-up roll mounted thereon.

The ply servers A, B, C are unique units designed to apply to the carcass building drum 60 (or onto ply materials having previously been placed on that drum) predetermined lengths of inner liner and ply materials which are supplied from large supply rolls PR (see FIG. 2). These units and their method of operation constitute the invention of this application.

The desired length of ply material PM is measured by feeding the material past a detector 118 which is located a known fixed distance along the continuous main feed conveyor belt 122 moving around cylindrical guide means R extending across a frame FR, under control of a programmable mechanism which is set to the desired ply length. Bearings RB on frame FR support the ends of the cylindrical guide means R. Once the leading edge of the ply material reaches this detector, it is advanced further by a variable distance corresponding to the programmed ply length. Thus the fixed length plus the variable length equals the programmed total desired ply length. The web of material PM is then severed at the length desired by a cut-off mechanism 130. A lateral guiding device 123 acts to maintain the location of the longitudinal centerline of the length of ply material PM on the conveyor 122, whereby a central plane which extends through the carcass building drum 60, transverse to its axis of rotation, can be located on the centerline of the ply material.

When the carriage 55, and the carcass building drum 60 thereon, are located on this centerline, the ply PM is then fed onto the drum parallel to and upon its rotating surface. Each server has an applicator head 140, including two of the cylindrical guide means R, for this purpose, arranged to be extended into close proximity to drum 60 at the appropriate time. The carriage drive is programmed to move drum 60 into a location where it is precisely located with respect to the longitudinal centerline of the oncoming ply material PM.

At the opposite end of the server, away from the track and carriage, there is a receptor arrangement 148 into which a cart 150 bearing a roll PR of ply material can be docked, thus each server can always be supplied quickly with additional ply material as demanded. Further, the servers can be re-stocked with different types or sizes of ply material to build different types of tires, and to different specifications. By using more or less servers in a particular tire construction job, the machine can build carcass (and tires) having different numbers of plies and/or different types of plies. Thus a linear arrangement of ply and other servers is preferred (but not essential) in the carcass building section I of the system from the standpoint of having adjacent aisle space to manipulate the carts, bringing in fresh supplies of ply material and removing spent supplies for replenishment.

The ply material is, typically, some suitable type of fabric material that has been thoroughly coated with uncured rubber on both sides and for building a radial ply tire, the ply material has cords which are predominantly extending transverse to the length of the material as it is aligned for construction into the tire carcass. It is a feature of this invention to supply this material on relatively large rolls PR into which are interwound a separator web material SW or fabric, e.g. a carrier web, for purpose of preventing the tacky rubberized cord layers from sticking to itself. The rolls of ply material are loaded into cartridges away from the machine, brought to the machine and docked at the selected ply server station receptors, and the ply material is led into the server mechanism through the feeding and guiding mechanism 120. In so doing, separator web SW is led onto a take-up roller on the cartridge, so as the ply material is being driven out onto the server, the separator web is re-rolled and stored in the cartridge for future reuse.

During the docking action, a drive 121 at the rear of the server is automatically connected to the takeup roll. The ply stock drive-out is controlled by a typical dancer/loop control (not shown) which signals stop/flow requirements via photo-eye sensors to the motor M in drive 121. During drive-out, the carrier web is being wound onto a rewind spool, which action is further aided by a set of edge guiders that control a lateral motion system to assure that the carrier web is wound on the take-up roll in a generally even and cylindrical configuration. In this arrangement, the carrier web never enters the server like on other conventional machines, and by remaining essentially a captive member of the supply cartridge it is possible to change supply cartridges quickly and without having to manually rewind carrier webs that were partially or fully unwound, which is a very undesirable task with conventional server machines.

Figure 3:
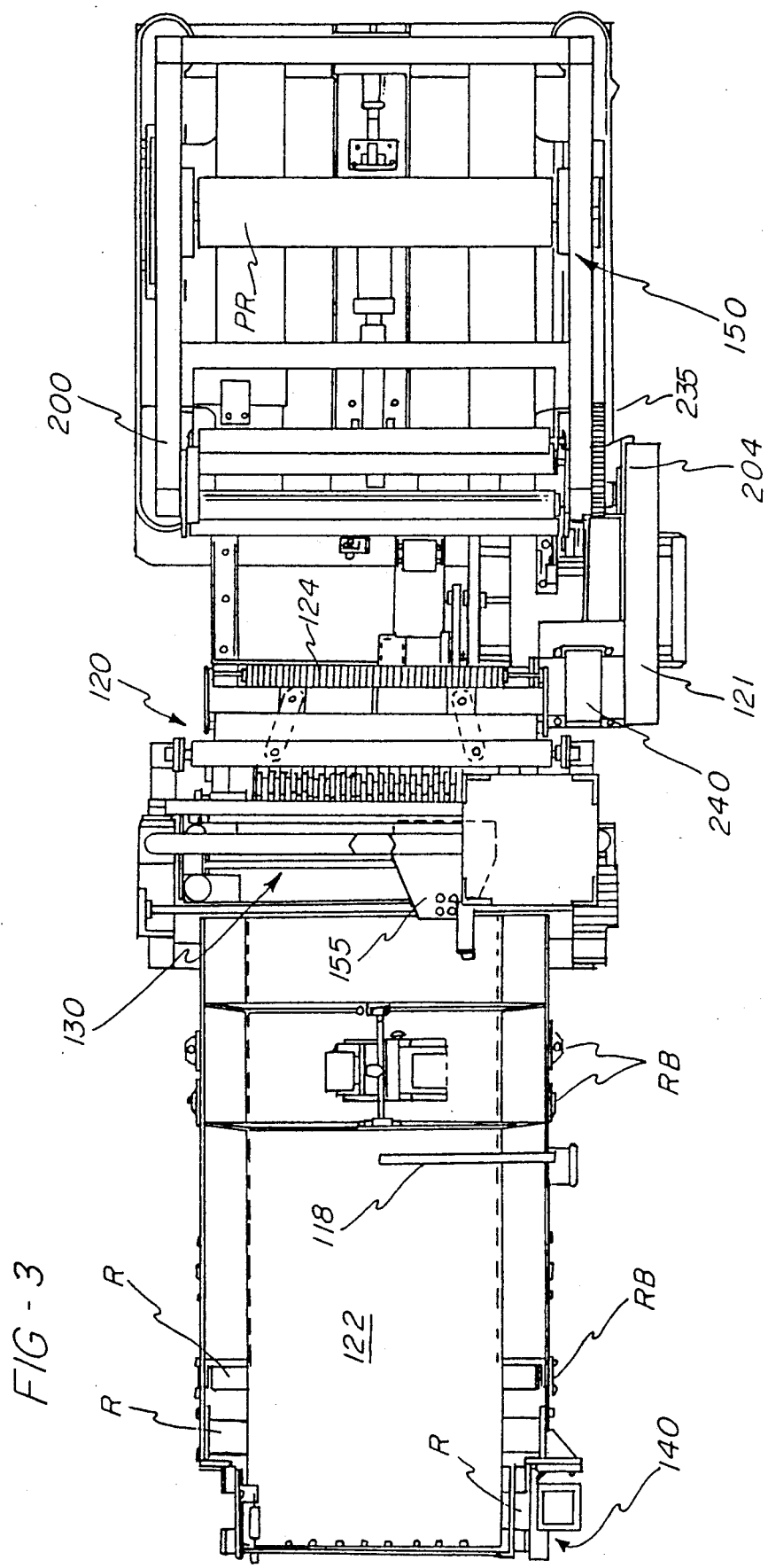
FIG. 3 is a top plan view showing the ply server assembly of FIG. 1.
Figure 6:
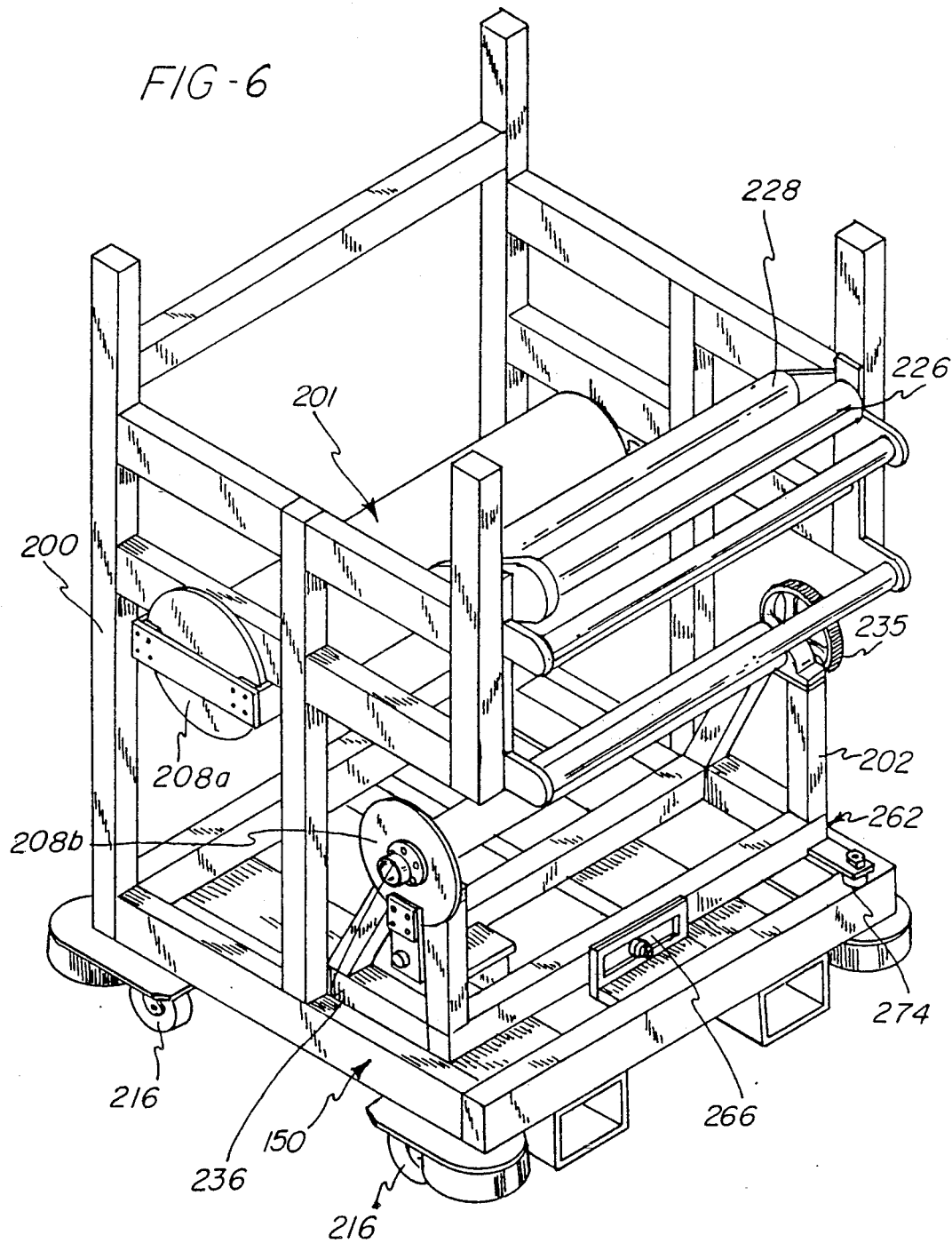
FIG. 6 is a perspective view of the ply material supply cart of FIGS. 2 and 3, removed from the server and with the continuous supply roll removed.
Figure 7:
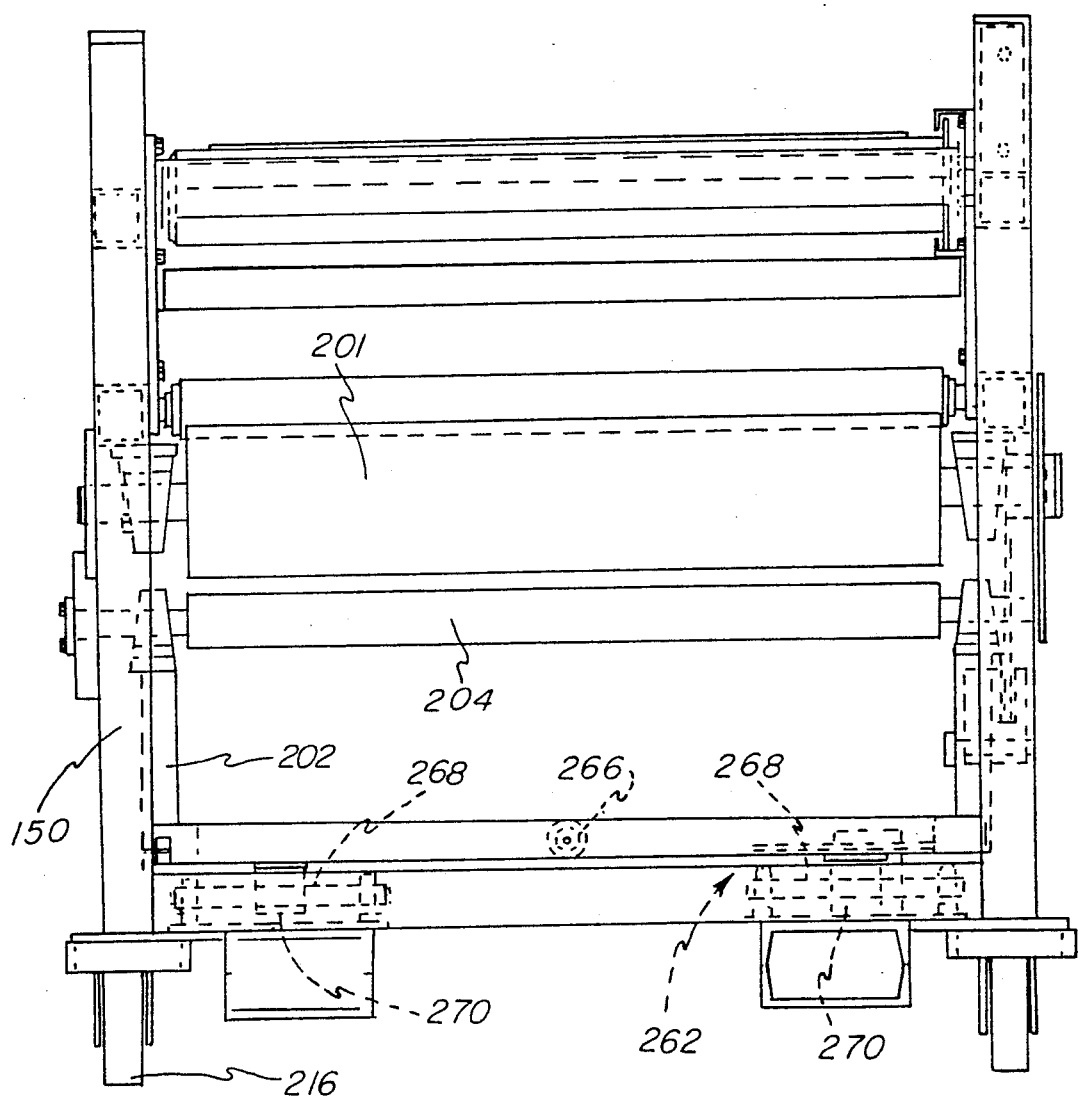
FIG. 7 is a rear elevation view of the supply cart of FIG. 5 removed from the server.

As shown in FIGS. 3, 6 and 7, the cart 150 comprises a rigid main frame 200 having a supply roller 201 for supporting the ply material supply roll PR (FIG. 2), a subframe 202, and take-up roller 204 for supporting a carrier web take-up roll (not shown). The supply roller 201 and the take-up roller 204 each include a typical air actuated disk brake assembly 208a and 208b, respectively, mounted to main frame 200 and subframe 202, respectively. The supply roller brake assembly 208a is spring biased to provide a slight drag on the supply roller 201 to prevent freewheeling of the supply roll PR.

Figure 4:
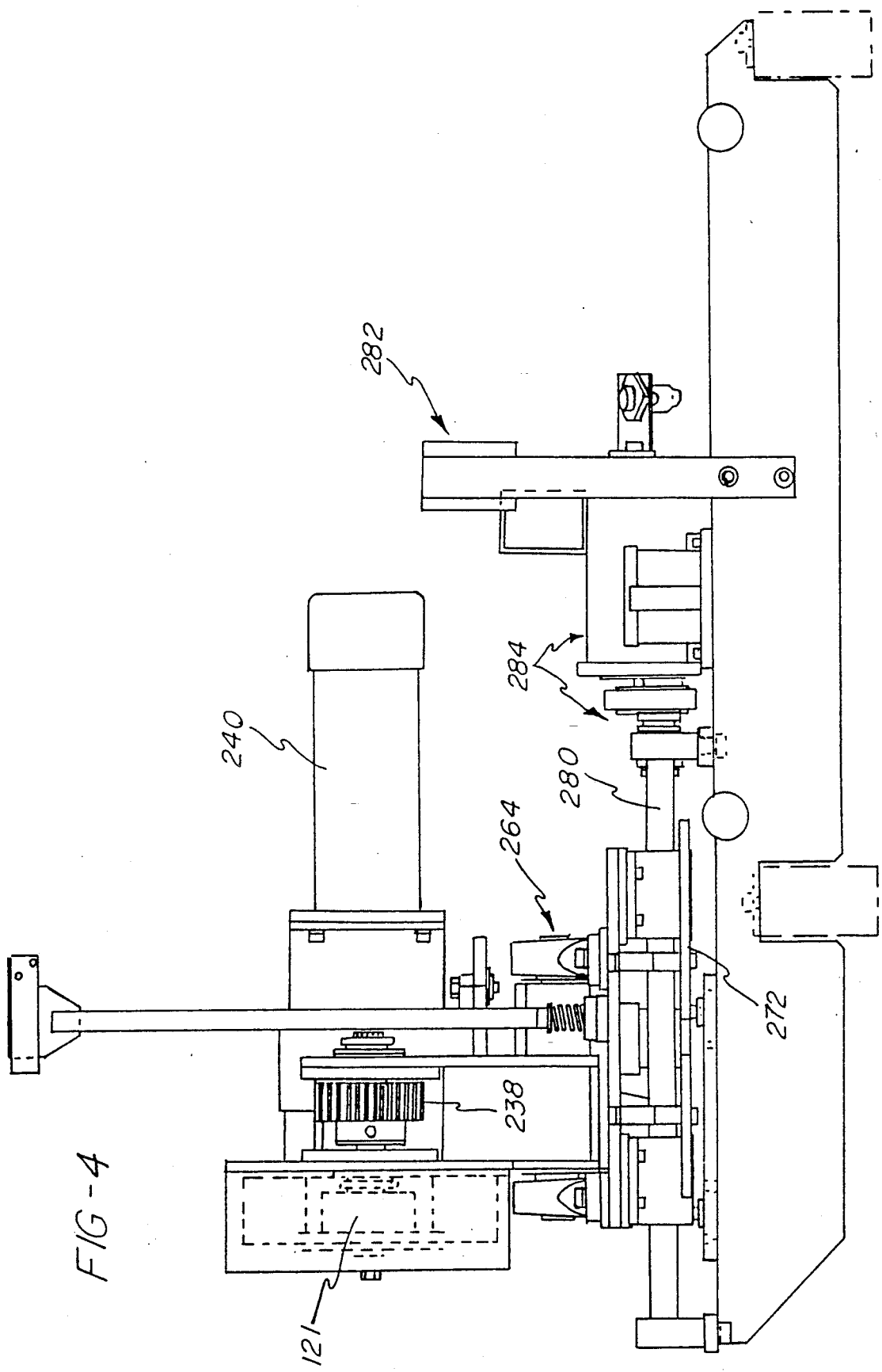
FIG. 4 is a rear elevation view of the carrier web take-up roller driving and adjusting assembly with the supply cart removed.

The main frame 200 is mounted on wheels 216 which are received in corresponding tracks 218 to guide the cart towards the server until the cart contacts stops 220 mounted to the server (FIG. 4). The cart is locked into place using a locking assembly 222 to maintain the proper distance and alignment of the supply roll and the take-up roller 204 with respect to the ply server.

After being locked into position, the supply material comprising the ply material PM and the carrier web CW, is withdrawn from the supply roll PR and fed between a stripper roller 226 and a knurled roller 228 to strip and separate the carrier web CW from the ply material PM. The separated ply material is then fed into the server while the carrier web CW is gathered and rewound on the take-up roller 204 for subsequent replenishment with new ply material.

As shown in FIGS. 3, 4, 5 and 6, the take-up roller 204 includes a spur gear 235 mounted to one end of a shaft 236 which is mounted to and concentrically positioned within the take-up roller 204. A similar spur gear 238, driven by a D.C. motor 240 through belt and gear assembly 241, cooperates with the spur gear 235 on shaft 236 to wind the separated carrier web onto the take-up roller 204.

This supply cart has an adjustment means (FIG. 7) which cooperates with a take-up roll adjustment drive assembly 264 on the server (FIG. 5) for laterally adjusting the take-up roller 204 with respect to the server, thus ensuring that the carrier web CW is wound into a generally cylindrical roll on the take-up roller 204.

The adjusting means 262 includes a horizontal positioning guide 266 and a pair of horizontal guide shafts 268 mounted to the main frame. The positioning guide 266 and the guide shafts 268 cooperate with a pair of corresponding slides 270, mounted to the carrier web take-up roll subframe 202, to laterally guide the movement of the take-up roller and roll 204.

Figure 5:
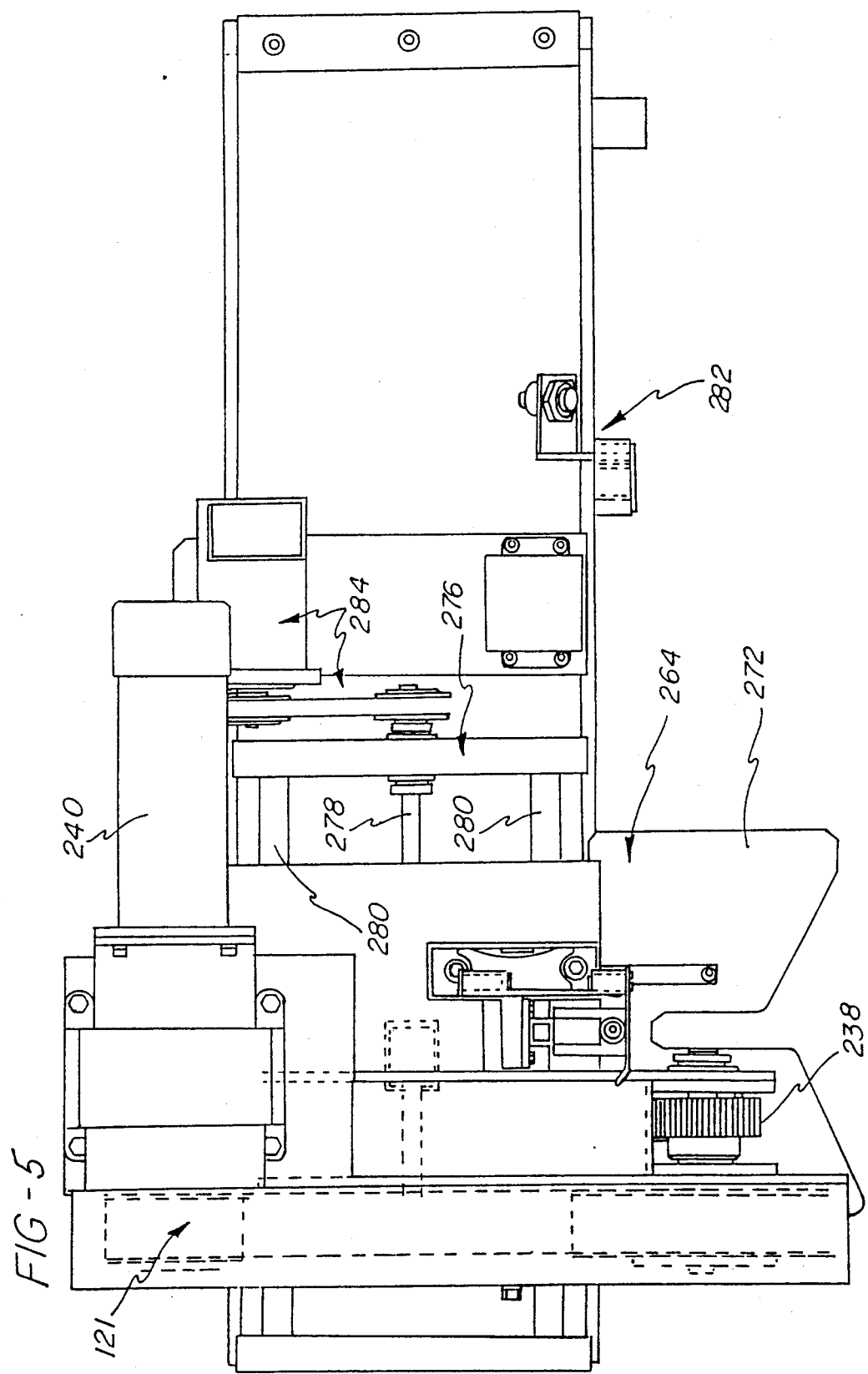
FIG. 5 is a top plan view showing the carrier web takeup roller driving and adjusting assembly of FIG. 4.

As shown in FIGS. 5 and 6, the take-up roll adjustment drive assembly 264 comprises a cam 272 for engaging a cam follower 274 mounted to the main frame 201 for pivoting the carrier roll subframe 202, and a linear actuator and motor 284 to drive the cam 272. The cam 272 is attached to a horizontal actuation shaft assembly 276 having a driven shaft 278 and a pair of parallel horizontal support shafts 280.

A side-guide edge scanner 282 (FIGS. 4 and 5) is provided for sensing the location of the edge of the ply material PM being drawn into the server and for cooperating with a programmable control or the like (not shown), to control the linear actuator and motor assembly 284 to laterally slide cam 272 and pivot the cam follower 274, thereby laterally sliding the subframe 202 and take-up roller 204, to align the take-up roll 206 with respect to the used carrier web CW.

The ply material, after leaving the dancer/loop control enters a guide assembly 123 (see FIG. 2) including an active guide roller 24 which is steered to center the ply material PM for programmed feeding of the material onto feed-out conveyor 122 through the nip of a pair of servo driven feed rolls 120. Steering signal requirements for guide assembly 123 are provided through a quartz crystal controlled LED emitter 127 and a tuned receiver 128, which provide constant information as to the location of the edges of ply material PM moving from the guide assembly to feed rolls 120. The ply material PM, after being separated from the carrier web CW, is fed over the ply guide assembly 123 and its wheeled roller 124 (FIG. 8), formed of a series of freely rotating rollers 290. Roller 124 permits the ply material PM two-degree of movement for longitudinally and laterally adjusting the feeding of the ply material into the server.

Figure 8:
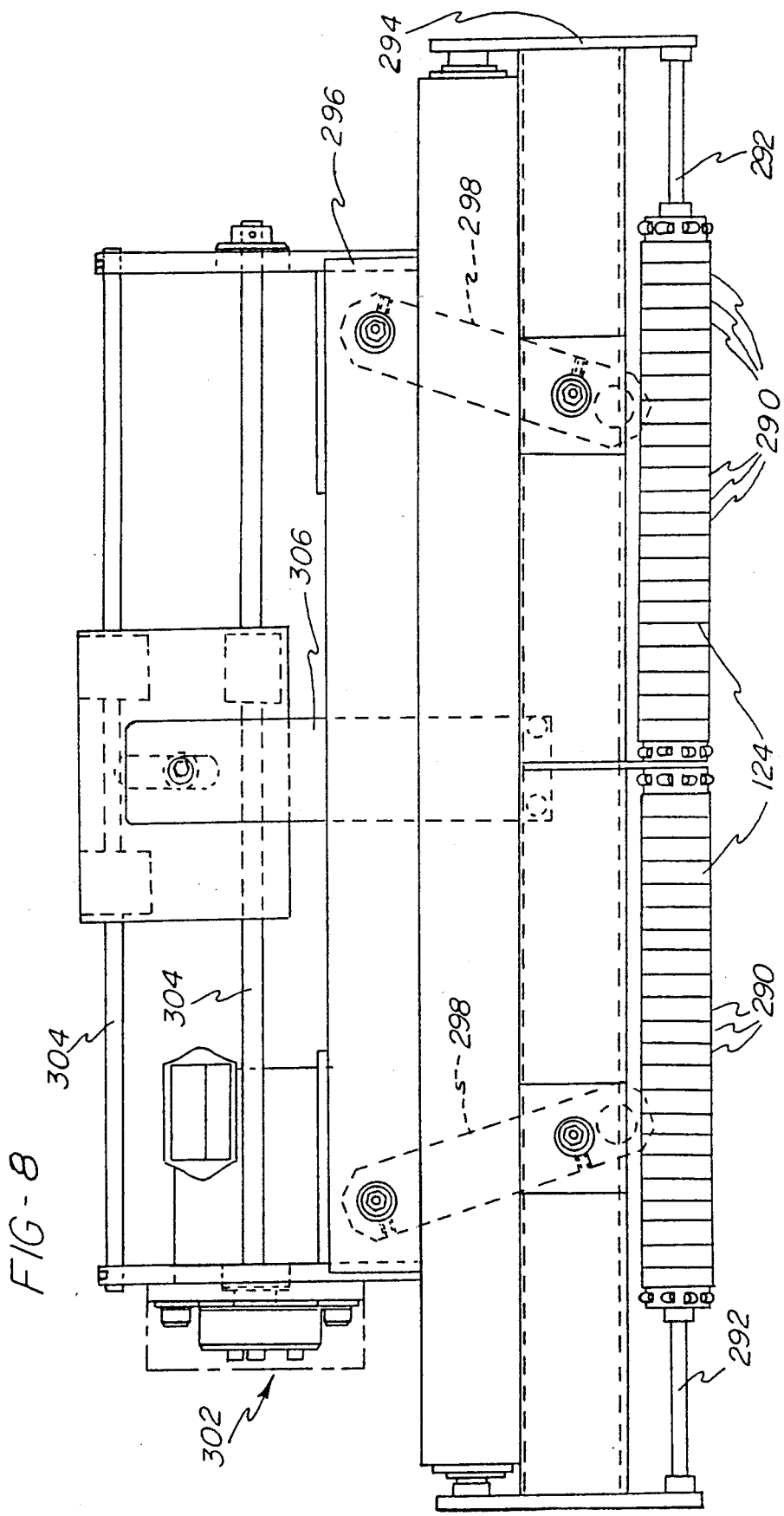
FIG. 8 is an enlarged detail view showing the ply material in-guide assembly of the ply server.

The roller 124 is concentrically mounted along a shaft 292 which is rotatably mounted to a roller support 294 (FIG. 8). The roller support 294 is in turn attached to a stationary frame structure 296 by pinned arms 298.

In operation, the ply material being fed through the server is laterally adjusted using the output of receiver 128 to drive a programmable controller (not shown) to control a motor and a pulley assembly 302 and a series of shafts 304. The pulley assembly and shafts 304 laterally move drive arm 306 to pivot pinned arms 298 and adjust the roller 124. The material thus enters conveyor 122 straight and on center.

The ply material PM is fed into the nip between power driven feed rolls 120, then past a traversing cut-off knife mechanism 132 (FIGS. 9–11), under a pair of vacuum lift boxes 133 and 134 (FIG. 12), and onto the main feed conveyor 122 of the server. Length scanner 118 is mounted over this conveyor, at a fixed distance away from the path of the cut-off knife, as mentioned. The mechanism PP supported over conveyor 122 is an optional printing mechanism which may be added to the innerliner server for printing some form of identification on the surface of the innerliner ply which becomes the interior of the tire.

The feed rolls 120 are powered by a servomotor 121 to draw ply material from the loop and feed it past the cut-off mechanism 130 onto the main ply feed conveyor 122 until the leading edge of the ply is sensed by the length scanner 118. The servomotor 121 is then reactivated and drives out an additional length of ply material PM, which additional length is programmably determined by keyboard input at a control terminal. This arrangement permits quick length changes and assures ply length accuracies and repeatability, which the operator-dependant, manual cut-off method using a conventional hot knife never could achieve.

At the end of the drive-out, the vacuum boxes 133, 134 (FIG. 12) descend, energize and lift the portion of the material under the transverse path of cut-off knife 132, bringing that portion of the material into the transverse path of the knife mechanism. The lift action of the vacuum along with the inner edge contour design of the vacuum boxes (FIG. 12) form a transverse ridge PM-R of the ply material which imparts additional rigidity to the web against the action of the knife, which is then driven along the ridge to sever the ply material to the prescribed length. Preferably the knife includes an ultrasonic vibrating device 132B (FIG. 10). Once this cut is made, the vacuum is released, the length of material is dropped onto the server conveyor, and it is fed forward around the applicator head 140 at the front end of the server, to await the arrival and registration of the carcass building drum 60.

Referring to FIGS. 9–11, the knife mechanism includes a carriage 155 which supports the knife blade 132 and the vibrating device 132B. Carriage 155 in turn rides along a guide rod 157 and a drive rod 158, the ends of which are supported in side plates 160 which also support the ends of vacuum boxes 133 and 134. The vacuum supply hoses and control valves are omitted since they are conventional, and details are not important to the invention. A reversible drive motor 132M is connected by a belt drive 163 to the drive rod 158, such that rotation of this motor causes the knife carriage to traverse blade 132 along the space between the vacuum boxes, as seen in FIG. 12, this motion being indicated by arrows in FIG. 9.

The side plates are part of a framework 165 supported on vertical guide rods 166 which define the vertical path of motion of the framework, and a pneumatic cylinder 167 is connected by suitable linkage 168 to raise and lower the entire framework, this motion indicated by arrows in FIG. 9.

Thus, when the proper length of material has been fed out onto conveyor 122, the framework 165 is lowered, with the knife mechanism to one side of the conveyor belt. Vacuum is then applied and the framework is lifted, carrying the portion of the material PM to be severed upward from the conveyor belt. The knife mechanism 132 traverses and severs the length of material PM, then the vacuum is turned off to box 134 and it is vented to atmospheric pressure. The trailing edge of the material length PR drops onto conveyor belt 122, and that belt is driven forward (toward the applicator head 140) until the leading edge of the material PM is at or somewhat below the elevation of the longitudinal centerline (e.g. the axis of rotation) of the carcass building drum 60 (see FIG. 2).

When carriage 55 c the respective servers A, B Or C the frame FR supporting conveyor belt 122, which is carried on slide rods 171, forward by suitable pneumatic drive cylinders 170 (FIG. 2) and the applicator head 140 causes the forward end of conveyor belt 122 to conform to the side of drum 60 between the cylindrical guide means R in the applicator head, adhering the material PM to the drum surface (or to a previous component thereon), and the drum 60 is caused to make one 360° rotation, thereby drawing the length of material PM onto the drum 60, as shown in phantom at the left end of FIG. 2.

An optional arrangement for locating the carriage and carcass drum indexed before the server is shown in FIG. 3. As the cut ply material PM is conveyed to the ready position at the front of the server, a traverse scanner 158 (FIG. 3), mounted to the conveyor belt frame, cooperates with a programmable control, and moves transversely across the ply material as shown by arrows 160, to sense the edges 156 of the ply material and determine the location of the longitudinal centerline of the ply material with respect to the edges of the conveyor belt.

With the edge to edge specification being pre-programmed into a central processor for the machine, the scanning option also can serve as a quality control means for alerting the operator audibly or optically when "out of specification width" material is being supplied to the machine.

While the method herein described, and the forms of apparatus for carrying this method into effect, constitute a preferred embodiment of this invention, it is to be understood that the invention is not limited to this precise method and forms of apparatus, and that changes may be made in either without departing from the scope of the invention, which is defined in the appended claims.

What is claimed is:

1. A server assembly for receiving ply material from a continuous supply of ply material and applying a preselected length of ply material onto the outer surface of a building drum, comprising:

a building drum having a generally cylindrical building surface and supported for rotation about a predetermined axis;

a continuous conveyor belt;

a conveyor frame located adjacent and to one side of said drum;

a plurality of cylindrical guide means on said conveyor frame supporting said conveyor belt along said frame and defining an upper flight of said belt movable along a path extending at right angles to the surface of the building drum and a lower return flight of said belt, said frame including an applicator head and at least two of said cylindrical guide means being located on said applicator head in vertically spaced positions to guide a portion of said belt in a generally vertical direction at said applicator head adjacent the drum surface, said portion of said belt providing an applicator section;

feeding means for feeding the ply material onto said conveyor belt at the end of said frame opposite from said applicator section of said belt;

means for locating the centerline of the ply material on said conveyor belt parallel to the path of movement of said conveyor belt;

knife means for cutting the ply material in a direction generally perpendicular with respect to the centerline leaving a predetermined length of ply material supported on said conveyor belt;

drive means for selectively driving said conveyor belt to move its upper flight along said path toward the drum surface to define the predetermined length of ply material to be cut by said knife means, and for subsequently diving said conveyor belt to carry a leading portion of such predetermined length of ply material onto said applicator section; and means for moving said conveyor frame toward said building drum surface to press the portion of such predetermined ply length between the two cylindrical guide means on said applicator section of said conveyor belt against a substantial area, lengthwise and circumferentially, of said building drum surface;

said belt causing the predetermined length of ply material to conform to said building drum surface as said building drum is subsequently rotated to transfer the predetermined ply length onto said building drum surface.

2. The server assembly as defined in claim 1 wherein said means for locating the centerline of the ply material on said conveyor belt includes means for adjusting said feeding means to position the centerline of the ply material with respect to said upper flight of said conveyor belt.

3. The server assembly as defined in claim 1 wherein said knife means includes means for lifting a portion of the ply material at the trailing end of such predetermined length from said conveyor belt, and a traveling knife blade movable above and across the path of the upper conveyor flight to cut the lifted portion of the ply material to the preselected length.

4. The server assembly as defined in claim 1 further comprising programmable means controlling said drive means for changing the preselected length of the ply material pulled past said knife means.

5. The server assembly as defined in claim 1 wherein said conveyor belt is a single wide endless flexible belt of sufficient length and width to support all of said predetermined length of ply material.

6. The server assembly as defined in claim 1 wherein the continuous source of ply material is a supply roll having an interwound carrier web, a moveable cart separable from said server assembly and having means for supporting the continuous supply roll, means on said cart for separating the ply material from the carrier web, and a take-up roller on said cart for gathering and rewinding the carrier web;

feeding means in said server assembly for feeding the ply material onto said conveyor; and drive means in said server assembly adapted to engage with said take-up roller to power said take-up roller when said cart is docked at said server assembly.

7. The server assembly as defined in claim 6 wherein said cart includes means for laterally adjusting the take-up roller with respect to said feeding means to maintain an even roll of the carrier web; and power operated adjusting means on said server assembly adapted to drive said adjusting means when said cart is docked to said server assembly.

8. A server assembly having a receiving end for receiving ply material from a continuous supply thereof and a delivery end for applying a preselected length of the ply material onto the outer surface of a building drum located at a delivery position adjacent the server delivery end; comprising a building drum having a generally cylindrical building surface and supported for rotation about a predetermined axis;

a continuous belt conveyor having an upper carrying flight;

a conveyor frame including means supporting said conveyor belt with said upper flight arranged to move from said receiving end toward said delivery end of the server assembly;

means for selectively driving said conveyor belt along said conveyor frame to carry ply material toward said delivery end;

said conveyor frame including an applicator head at said delivery end;

said means for supporting said conveyor belt including at least two vertically spaced apart cylindrical guide means in said applicator head directing a portion of said conveyor belt generally vertically of said applicator head adjacent to said drum surface, said portion of said belt providing an applicator section;

feeding means for feeding the ply material onto said conveyor belt at said receiving end of the server assembly and locating the ply material on said conveyor belt;

power driven knife means mounted above and across said conveyor belt to traverse said receiving end of said server for cutting the ply material fed onto said conveyor belt in a direction generally perpendicular to the length of said conveyor belt leaving a predetermined length of ply material supported on said conveyor belt; and means for moving said applicator section of said conveyor belt between the two cylindrical guide means against a substantial area, lengthwise and circumferentially, of the building drum surface to adhere a substantial portion of the predetermined length of ply material onto the outer surface of the building drum.

9. A ply material server assembly as defined in claim 8, further including power driven feed roller means adjacent said receiving end and operative to withdraw ply material form the supply thereof and feed the ply material past said knife means and onto said conveyor belt in synchronism with forward driving of said belt, whereby a predetermined length of ply material is laid onto said belt.

10. A ply material server assembly as defined in claim 8, further including guiding means cooperating with said feeding means to align the ply material on the receiving end of said conveyor belt, and adjustable measuring means supported over said conveyor belt for sensing the leading edge of the ply material on said conveyor belt and signalling that a predetermined length of ply material has passed said knife means.

11. A ply material server assembly as defined in claim 8, further including dock means for locating a supply cart with a supply roll of ply material at said receiving end of said server assembly, and means for controlling the tension in ply material moving from the supply cart to said feeding means.

12. A server assembly for receiving ply material from a continuous supply of ply material and applying a preselected length of ply material onto the outer surface of a building drum, comprising:

a building drum having a generally cylindrical building surface and supported for rotation about a predetermined axis;

a continuous conveyor belt;

a conveyor frame located adjacent and to one side of said drum;

a plurality of cylindrical guide means on said conveyor frame supporting said conveyor belt along said frame and defining an upper flight of said belt movable along a path extending at right angles to the surface of the building drum and a lower return flight of said belt, said frame including an applicator head and at least two of said cylindrical guide means being located on said applicator head in vertically spaced positions to guide a portion of said belt in a generally vertical direction at said applicator head adjacent the drum surface, said portion of said belt providing an applicator section;

means for placing a predetermined length of ply material onto said upper flight of said conveyor belt, including means for locating the centerline of such predetermined length on said conveyor belt parallel to its path of movement;

drive means for driving said conveyor belt to carry a leading portion of the predetermined length of ply material onto said applicator section; and means for moving said conveyor frame toward the building drum surface to press the leading portion of ply material on said applicator section between the two cylindrical guide means against a substantial area, lengthwise and circumferentially, of said building drum surface;

said belt causing the predetermined length of ply material to conform to said building drum surface as said building drum is subsequently rotated to transfer the ply length onto said building drum surface.

* * * * *